(12) United States Patent
Hume (10) Patent No.: US 8,259,705 B2
(45) Date of Patent: Sep. 4, 2012

(54) SYSTEM AND METHOD FOR PROXY SIGNALING MANIPULATION IN AN IP TELEPHONY NETWORK

(75) Inventor: Ronald Hume, Tamarac, FL (US)

(73) Assignee: OpenPeak Inc., Boca Raton, FL (US)

( * ) Notice: Subject to any disclaimer, the term of this patent is extended or adjusted under 35 U.S.C. 154(b) by 1869 days.

(21) Appl. No.: 11/129,330

(22) Filed: May 16, 2005

(65) Prior Publication Data

US 2006/0256773 A1    Nov. 16, 2006

(51) Int. Cl.
*H04L 12/66* (2006.01)

(52) U.S. Cl. ... 370/352; 370/260; 370/356; 379/265.01; 379/258; 379/243

(58) Field of Classification Search ............. 379/142.05, 379/221.01, 32.01–35, 265.01–266.1; 370/352–356
See application file for complete search history.

(56) References Cited

U.S. PATENT DOCUMENTS

| | | | |
|---|---|---|---|
| 5,036,535 A * | 7/1991 | Gechter et al. ........... | 379/265.11 |
| 6,697,333 B1 * | 2/2004 | Bawa et al. .................... | 370/238 |
| 6,751,210 B1 * | 6/2004 | Shaffer et al. ................ | 370/352 |
| 6,888,793 B1 | 5/2005 | Orui | |
| 6,967,933 B2 | 11/2005 | Chapuran et al. | |
| 2002/0057678 A1 | 5/2002 | Jiang et al. | |
| 2002/0067816 A1 | 6/2002 | Bushnell | |
| 2002/0173291 A1 | 11/2002 | Hutcheson et al. | |
| 2004/0037219 A1 * | 2/2004 | Shaffer et al. ................ | 370/217 |
| 2004/0190500 A1 | 9/2004 | Wratten | |
| 2005/0048981 A1 | 3/2005 | Anupam et al. | |
| 2006/0083193 A1 * | 4/2006 | Womack et al. ............ | 370/328 |
| 2006/0245350 A1 * | 11/2006 | Shei et al. .................... | 370/216 |

FOREIGN PATENT DOCUMENTS

| | | |
|---|---|---|
| JP | 2000-349901 | 12/2000 |
| JP | 2002-141935 | 5/2002 |
| JP | 2002-218063 | 8/2002 |
| JP | 2004-235778 | 8/2004 |
| JP | 2004-328104 | 11/2004 |
| JP | 2005-027131 | 1/2005 |
| JP | 2005-500723 | 1/2005 |
| WO | WO 2004/019599 A1 | 3/2004 |

OTHER PUBLICATIONS

International Search Report for PCT/US06/18754, dated Dec. 19, 2007, 12 pages.
France Telecom: "Optimisation of call routing in Serving to Serving procedure", 3GPP Draft; S2-012218, 3rd Generation Partnership Project (3GPP), Mobile Competence Centre; 650 Route Des Lucioles; F-06921 Sopohia-Antipolis Cedex; France, vol. SA WG2, no. Sophia Antipolis, France; 20010904, Sep. 4, 2001 XP050236209.

* cited by examiner

*Primary Examiner* — Yuwen Pan
*Assistant Examiner* — Ibraham Sharifzada
(74) *Attorney, Agent, or Firm* — Sterne, Kessler, Goldstein & Fox P.L.L.C.

(57) ABSTRACT

A call services manager and methods for improving the quality and efficiency of voice of Internet Protocol ("VOIP") calls are provided. In an embodiment a method to improve communication link utilization on a call requiring the use of a central service platform is provided. An additional method is provided to validate caller identification information exchanged between originating and terminating communication devices in an IP voice network. In a further aspect of the invention, a method using a call services manager is provided to dynamically switch from one call route to another based on quality of service considerations. A call services manager is also provided. The call services manager is a software proxy that can reside at any type of network element. The call services manager includes software modules to implement the above methods for improving VOIP quality, and can include other call service and quality improvement modules.

7 Claims, 13 Drawing Sheets

SYSTEM AND METHOD FOR PROXY SIGNALING MANIPULATION IN AN IP TELEPHONY NETWORK

BACKGROUND OF THE INVENTION

1. Field of the Invention

The invention relates to communications, and more particularly to voice over Internet Protocol ("VOIP").

2. Background Art

Voice of Internet Protocol ("VOIP") is rapidly replacing existing forms of voice communications. As VOIP continues to serve an increasing number of customers, ways to improve the quality and efficiency of VOIP services are needed.

BRIEF SUMMARY OF THE INVENTION

A call services manager and methods for improving the quality of voice of Internet Protocol ("VOIP") calls are provided. In an embodiment a method to improve communication link utilization on a call requiring the use of a central service platform is provided. When a call connection has been established between an originating communications device and the central service platform and a call connection has been established between a terminating communications device and the central service platform, the method includes passively monitoring signaling data about the call. In an embodiment, a call services manager located at a network element between the originating communications device and the central service platform is used. While monitoring signaling, the call services manager allows the central service platform to provide an enhanced call service.

Once the call services manager recognizes that the central service platform has provided the enhanced call service, the call services manager establishes a call connection between the originating communications device and a terminating communication device that excludes the central service platform. The call services manager then sends instructions to drop the call connection between the originating communications device and the central service platform and the call connection between terminating communications device and the central service platform. In this way, communication link utilization can be improved in that the links to the central service platform are not unnecessarily used during a call, after the central service platform has provided its initial enhanced call services.

This aspect of the invention is directed to the transfer of established calls, and is not simply a call transfer mechanism. The transfer of established calls is more difficult to achieve than a call transferring mechanism and supports call services, such as enabling the terminating user to interact with a central service platform to validate identity, enabling a terminating user to accept, reject or specify alternative call treatment and the like prior to removing a central service platform from the call.

In another aspect of the invention, a method is provided to validate caller identification information exchanged between originating and terminating communication devices in an IP voice network. In this aspect of the invention, a call services manager located in a terminating network monitors data packets associated with an establishment of an IP voice call to a terminating communications device. The call services manager accesses an identification authentication database to obtain caller identification information for an originating communications device placing a call. The calls services manager validates the authenticity of the caller identification information that was received in the call setup messages by comparing that information to the information received from the identification authentication database. The call services manager provides instructions to transmit data packets to the terminating communications device in which the data packets provide caller identification information and/or an indication of the authenticity of the caller identification information.

In a further aspect of the invention, a method is provided to dynamically switch from one call route to another based on quality of service considerations. In this aspect of the invention, a call service manager monitors performance of a call route being used, as well as monitors performance of other available call routes. The call service manager sends instructions to switch call routes based on quality of service considerations.

In another embodiment of the invention, a call services manager is provided. The call services manager is a software proxy that can reside at any type of network element. The call services manager includes software modules to implement the above methods for improving VOIP quality, and can include other call service and quality improvement modules.

Further embodiments, features, and advantages of the invention, as well as the structure and operation of the various embodiments of the invention are described in detail below with reference to accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Call Services Manager

Figure 1:
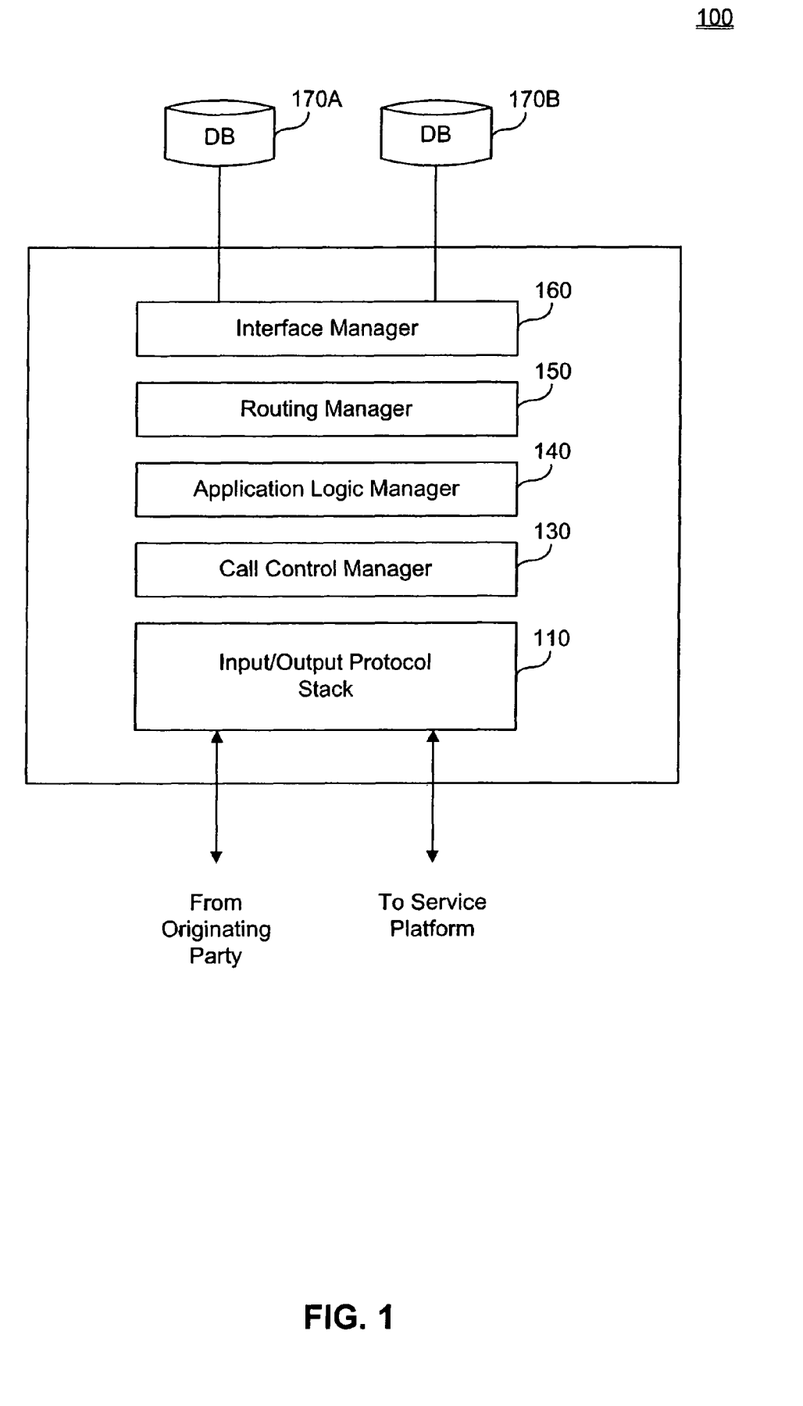
FIG. 1 is a diagram of a call services manager, according to an embodiment of the invention.

One aspect of the invention is directed to a software-based manager, referred to as a call services manager. The call services manager, which may be referred to as a proxy, is a software application that passively monitors call information and does not control calls like a physical switch does. The call services manager serves as a proxy of different components in a call. FIG. 1 is a diagram of call services manager 100. Call services manager 100 includes input/output protocol stack 110, call control manager 130, application logic manager 140, routing manager 150 and interface manager 160.

Input/output protocol stack 110 encodes and decodes messages in the network and distinguishes between signaling data and voice components in a call. The former component is monitored by call services manager 100 and the latter component is ignored and passed through to other network elements.

Call control manager 130 receives decoded message streams from input/output protocol stack 110 and performs the function of monitoring the data component containing administrative information about a call. The next functional block is application logic manager 140, which performs certain call processing functionality, such as bandwidth optimization and call routing.

Interface manager 160 is used to connect to external components, such as databases for accessing information necessary to processing the call. While routing manager 150 controls the interface manager and selects which of the external components, such as database 170A or 170B to access.

Network Optimization

In today's telephony networks, network link utilization is a significant cost issue, especially for service providers of centralized services such as corporate voicemail and contact centers. When a call is made to a terminating telephone in a corporate network, the call is first routed to a central service platform ("CSP") before being routed by the service platform to the terminating telephone. A CSP can be, for example, an voicemail platform, an integrated voice response ("IVR"), or an advanced intelligent network intelligent peripheral ("AIN-IP"). In the public switched telephone network ("PSTN"), routing to a service platform was traditionally accomplished by "hairpinning" the call, a process by which the CSP establishes, connects, and holds two separate call legs—one from the originating telephone to the CSP, and one from the CSP to the destination telephone.

Figure 2A:
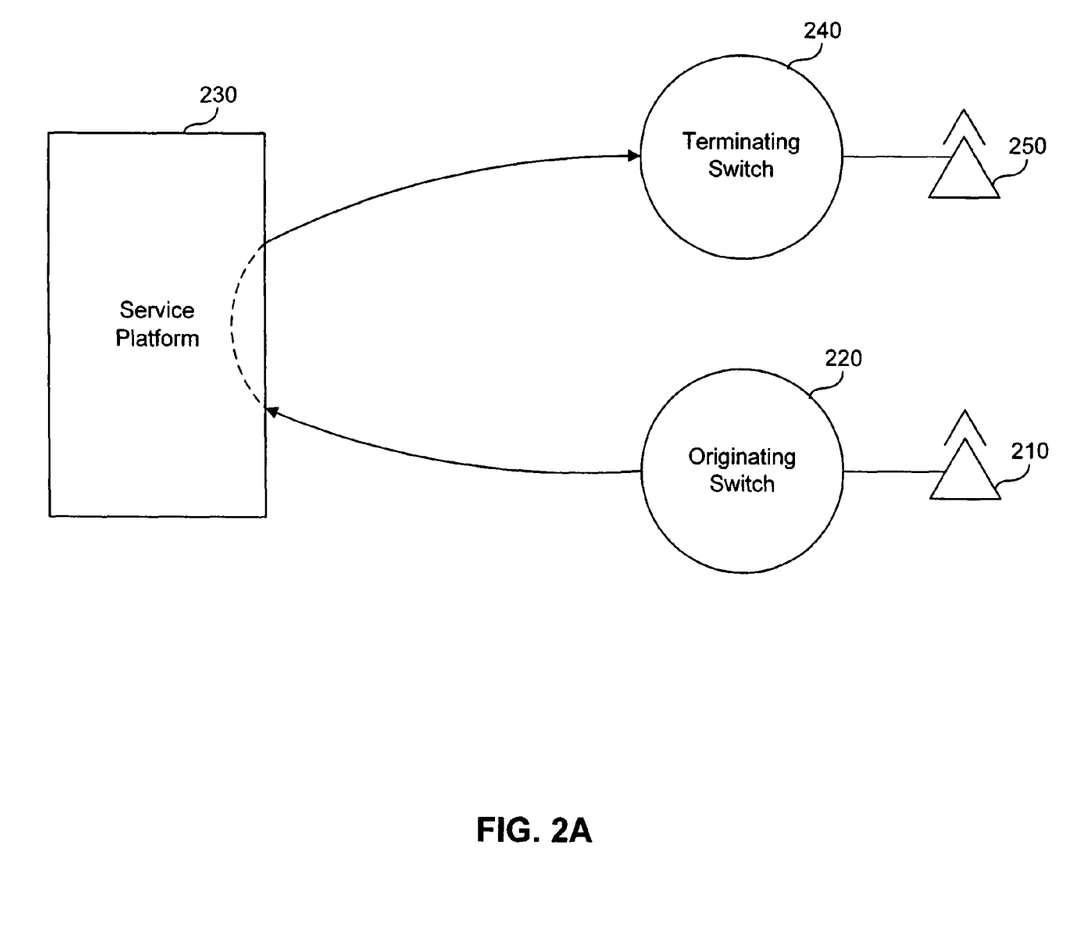
FIG. 2A is a diagram of a portion of telephone network illustrating routing a call to a service platform using a "hairpinning" method.

For example, referring to FIG. 2A, a user of originating telephone 210 places a call through originating switch 220. Upon receipt of the call, originating switch recognizes that the call should be routed to a CSP, and routes the call to CSP 230. CSP 230, for example, may be an IVR system that provides various prompts to the user of originating telephone 210 to determine how to process the call. Through the interactions with the user of originating telephone 220, CSP 230 determines that the call should be routed to terminating switch 240 for completion to terminating telephone 250. In doing so, CSP 230 ties up two trunk ports—one for the incoming call from originating telephone 210 and one to the outgoing call connection to terminating telephone 230. Thus, during the entire call connection between originating telephone 210 and terminating telephone 240, CSP 230 holds two trunk ports and the associated links busy, even though CSP 230 is no longer necessary for call processing.

Alternative routing methods have been implemented to avoid using ports of high price-per-port platforms like a CSP. These alternative methods include 2 B-channel transfer ("2BCT") and Release-Link-Trunk ("RLT") routing.

Figure 2B:
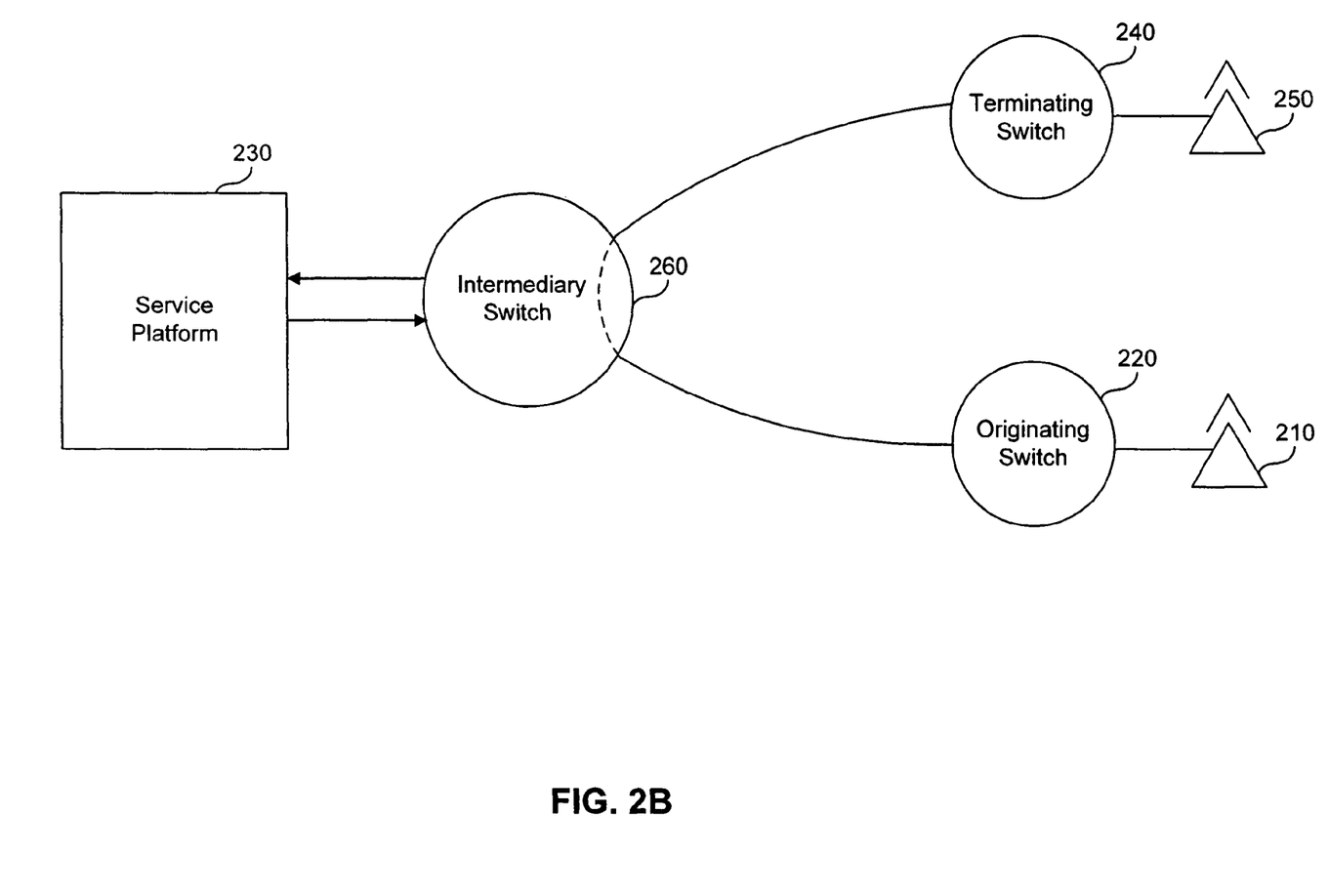
FIG. 2B is a diagram of a portion of a telephone network illustrating routing a call to a service platform using the two B-channel transfer method (2BCT).

In the 2BCT scheme, as illustrated in FIG. 2B, the less expensive ports of an intermediary switch are used to link/hairpin the two calls rather than the CSP itself. That is, the call legs are maintained by the switch, rather than the CSP, thereby obviating the use of the more expensive ports of the CSP to route calls. The intermediary switch, which resides between the originating and terminating telephones and CSP, communicates with the CSP via ISDN PRI links.

Thus, to connect a call from an originating telephone 210 to a terminating telephone 250 under the 2BCT scheme, four separate call connections are made using two separate networks. These include one call connection from originating switch 220 to intermediary switch 260 using SS7, ISDN, CAS or other telephony trunks, one call from switch 260 to CSP 230 using a B-channel ISDN link, one call from CSP 230 to switch 260 using a B-channel ISDN link, and a final call from intermediary switch 260 to terminating switch 240 that supports terminating telephone 250 using an SS7, ISDN, CAS or other telephony trunk.

In one example network configuration, originating switch 220 and terminating switch 240 can be central office switches and intermediary switch 260 can be an access tandem switch. In another example, originating switch 220 and terminating switch 240 can be private branch exchange (PBXs) switches, while intermediary switch 260 can be a central office switch. Other network configurations are possible.

Figure 2C:
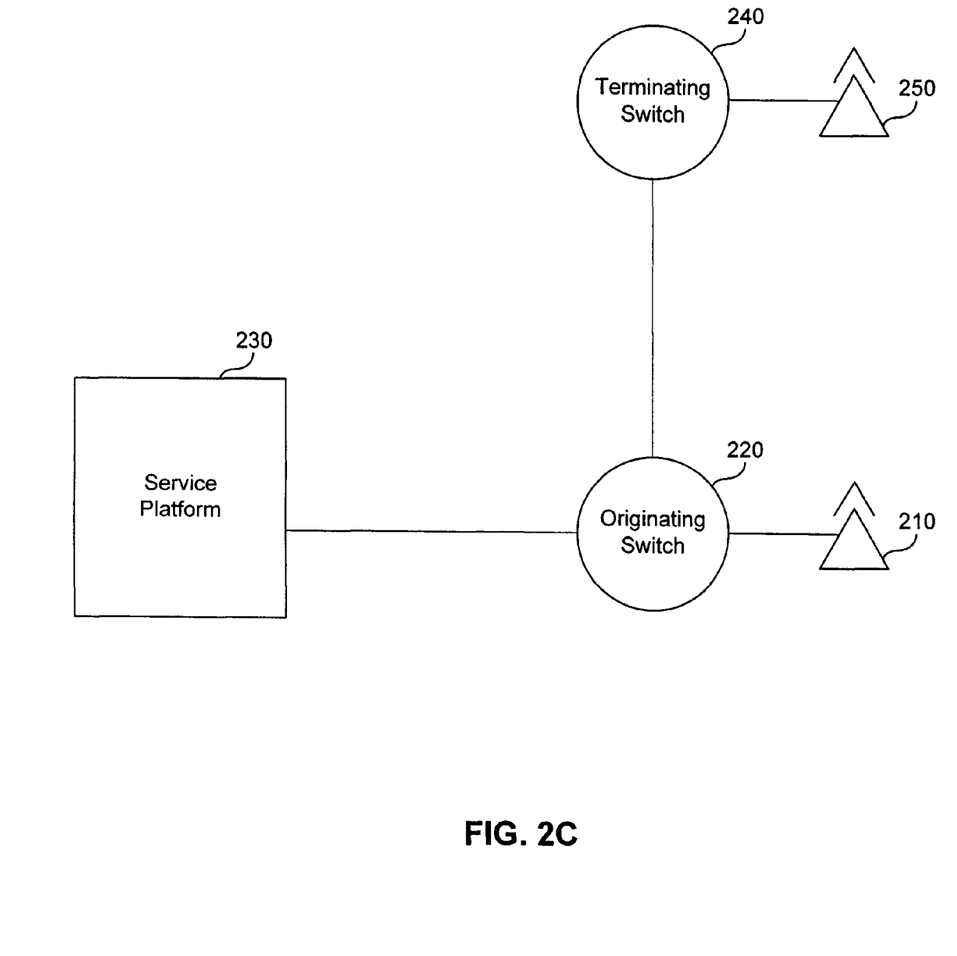
FIG. 2C is a diagram of a portion of a telephone network illustrating routing a call to a service platform using a release-link-trunk ("RLT") method.

In the RLT scheme, as illustrated in FIG. 2C, a call from originating telephone 210 intended for a terminating telephone 250 is received by the CSP 230. Originating switch 220 associated with originating telephone 210 interacts with CSP 230 and acquires information about terminating telephone 250. Once such information is received by originating switch 220, originating switch 220 terminates the call to CSP 230, thereby removing CSP 230 from the call path. Next, a separate and direct call is established by originating switch 220 between originating telephone 220 and terminating telephone 250 through terminating switch 240. The termination of the connection with the CSP and the establishment of a new connection with the terminating telephone are invisible to the user on the originating telephone.

Until recently, network link utilization and optimization in IP voice networks has not been an issue because IP bandwidth has been utilized less and is far cheaper than traditional time division multiplexed bandwidth in a PSTN network. However, that situation has changed with the proliferation of IP networks and a variety of IP-based voice services being offered by telephone carriers over those networks.

Figure 3:
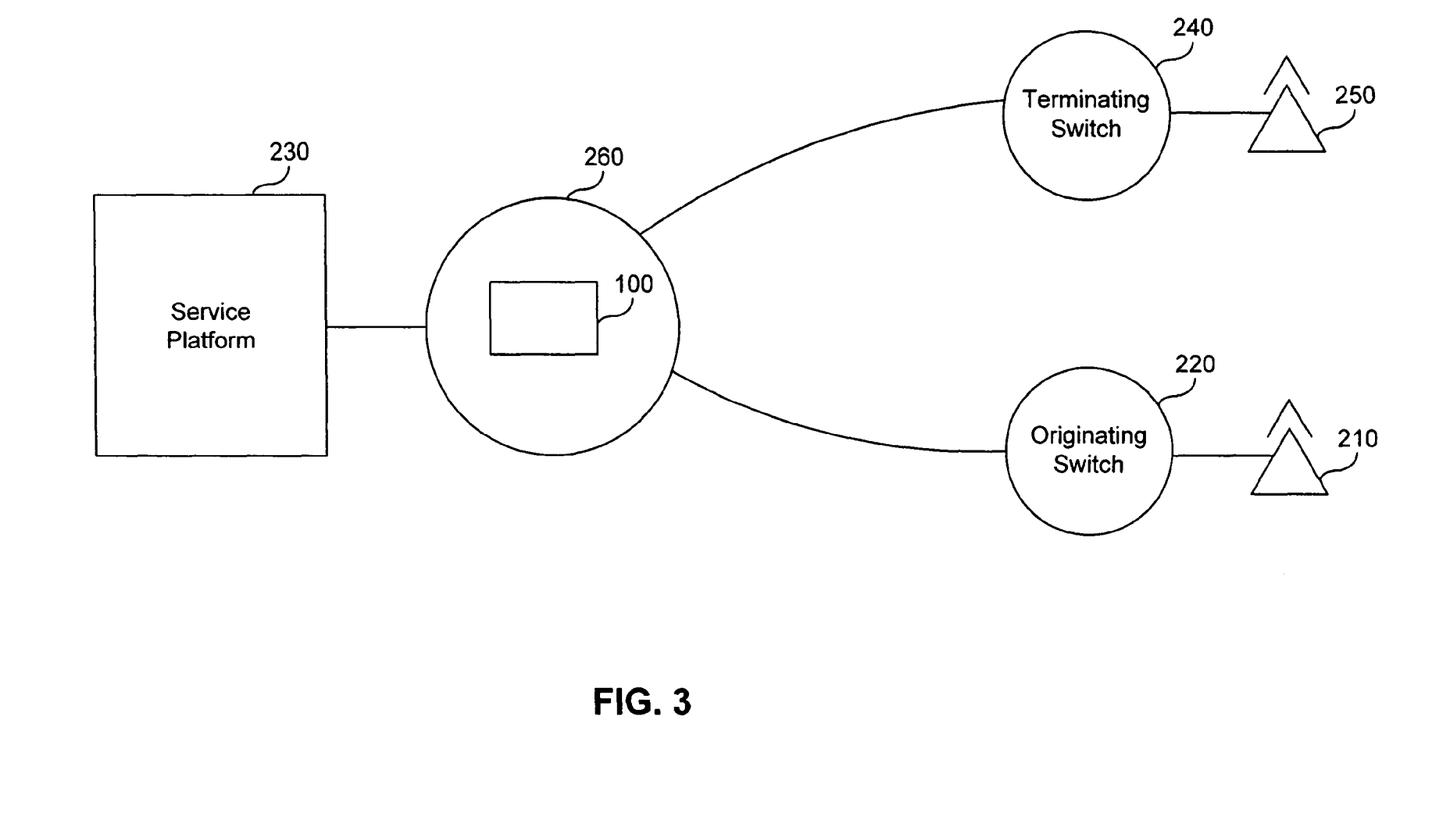
FIG. 3 is a diagram of a portion of a telephone network illustrating use of a call to a service platform using a call services manager to optimize link usage, according to an embodiment of the invention.

One aspect of the present invention is directed to SIP-based transfer of calls in an IP telephone network through the use of a software-based manager, such as, for example, call services manager 100. In this aspect of the invention, call services manager 100 performs the function of call processing and follow-on routing in place of a CSP. As illustrated in FIG. 3, call services manager 100 resides on an intermediary switch 260 or any other suitable network component that resides in the path between an originating telephone and a CSP. In that position, call services manager 100 is able to passively monitor signaling data about the call between an originating telephone, such as telephone 210 and a CSP, such as CSP 230. The voice component of the call bypasses call services manager 100 and is received by CSP 230. CSP 230 establishes another call to a terminating telephone, such as terminating telephone 250.

Importantly, however, unlike previous network arrangements described above, CSP 230 does not hairpin the call. That is, CSP 230 does not connect the two established calls. Rather, call services manager 100 makes a direct connection of the voice component between originating telephone 210 and terminating telephone 250. At the same time, the signaling component of the call continues to pass through call services manager 100, which in effect hairpins the signaling component. CSP 230 then terminates its connections with originating telephone 210 and terminating telephone 250 and is no longer in the call path.

Figure 4:
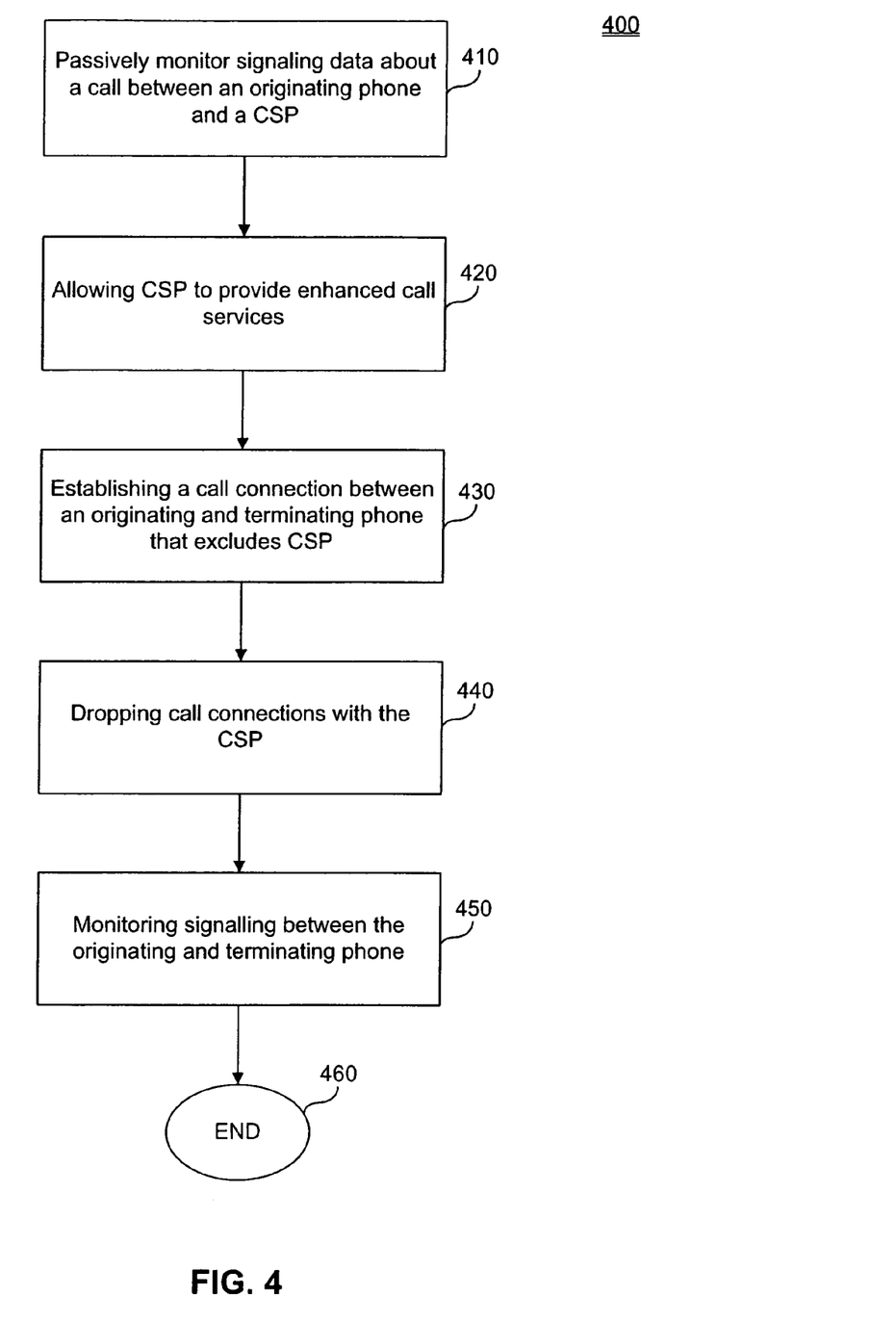
FIG. 4 is a flowchart of a method to improve link usage on calls requiring a service platform, according to an embodiment of the invention.
Figure 5A:
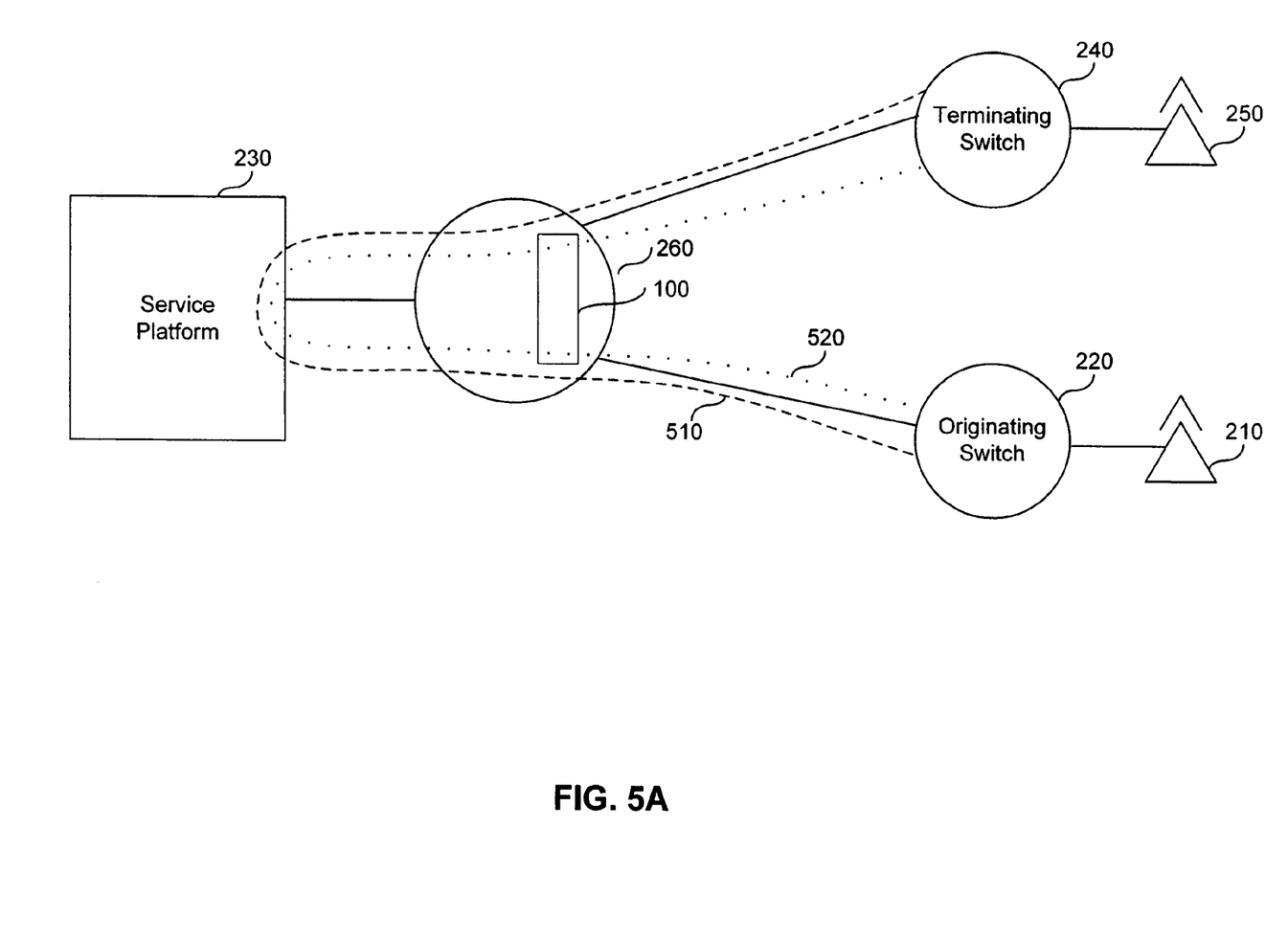
FIG. 5A is a diagram of a portion of a telephone network illustrating an initial stage in call setup involving a central service platform, according to an embodiment of the invention.

FIG. 4 is a flowchart of method 400 to improve link usage on calls requiring a service platform that relies on a proxy, such as call services manager 100, according to an embodiment of the invention. Referring to FIG. 5A, a call is placed from originating telephone 210. The call is routed through originating switch 220. Originating switch 220 recognizes that the call requires the services of CSP 230 and routes the call to intermediary switch 260, which in turn routes the call to CSP 230. CSP 230 then establishes a second call connection through intermediary switch 260 through terminating switch 240 to terminating telephone 250. In an embodiment intermediary switch 260 includes a call services manager, such as call services manager 100. In alternative embodiments, call services manager 100 could be located with originating switch 220 or any other intermediary switch or network element that existed between originating telephone 210 and service platform 230.

FIG. 5A shows the voice connection, represented by line 510 and the signaling connection, represented by line 520, that exists at this time in the call. As can be seen in FIG. 5A, voice connection 510 does not traverse call services manager 100, while the signaling connection 520 does traverse call services manager 100.

Figure 5B:
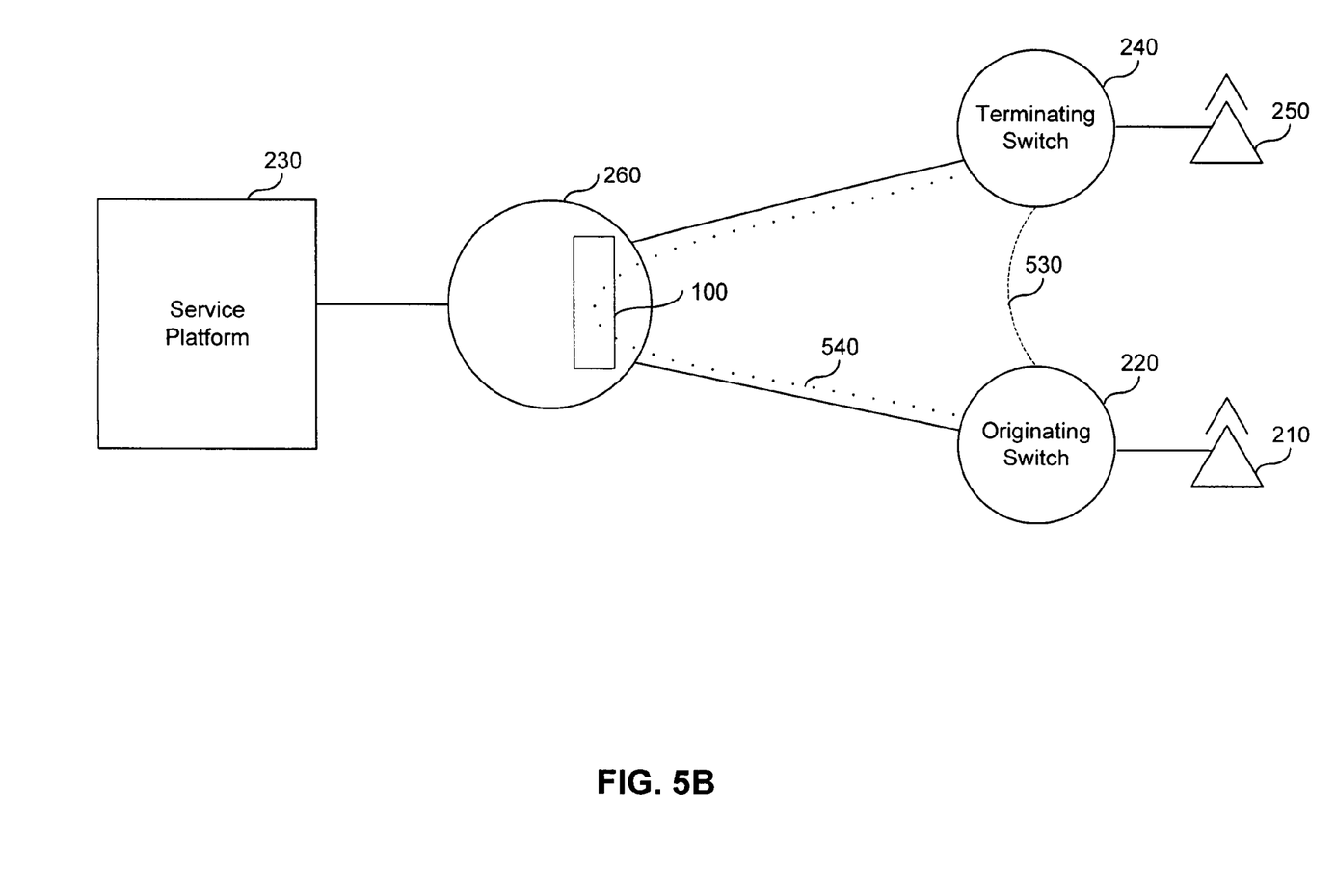
FIG. 5B is a diagram of a portion of a telephone network illustrating a subsequent stage in call setup involving a central service platform, according to an embodiment of the invention.

Method 400 begins when a network is in a state similar to that depicted in FIG. 5A. Method 400 begins in step 410. In step 410 a call services manager, such as call services manager 100, passively monitors signaling data about the call between originating telephone 210 and CSP 230. In step 420, CSP 230 is permitted to provide whatever enhanced call services are required. For example, CSP 230 could provide voice response prompts. In step 430, call services manager 100 establishes a call connection between originating telephone 210 and terminating telephone 250 that excludes CSP 230. In step 440, CSP 230 drops the call connections that involve CSP 230, which in effect transfers an established call from originating telephone 210 to terminating telephone 250. This situation is depicted in FIG. 5B. Prior to transferring an established call by eliminating CSP 230 from the call route, an aspect of the present invention enables the terminating telephone 250 to interact with CSP 230. For example, these interactions can include, but are not limited to, validating the identity of originating telephone 210 or to enable terminating telephone 250 to accept, reject, or specify alternative treatment of a call.

FIG. 5B shows that the voice connection, represented by line 530, now excludes CSP 230 and is routed directly from originating switch 220 to terminating switch 240 via an IP transport layer. In an alternative embodiment, voice connection 530 can be routed through intermediary switch 260 via an IP transport layer. FIG. 5B also shows that the signaling connection, represented by line 540 excludes CSP 230 and is routed from originating switch 220 to intermediary switch 260 through call services manager 100 to terminating switch 240.

In step 450, call services manager 100 optionally monitors ongoing signaling. The ongoing signaling monitor allows call services manager 100 to respond to changes in call characteristics and provide additional functionality as discussed below. In step 460 method 400 ends.

As discussed above, call services manager 100 is a software application that passively monitors information and does not control calls like a physical switch does. Neither the telephones nor the CSP are aware that call services manager 100 is involved in the call. Call services manager 100, in effect, serves as a proxy of different components in a call. For example, to the CSP, the call services manager 100 looks like an originating or terminating telephone. To originating telephone 210 and terminating telephone 250, the call services manager 100 looks like a CSP. Call services manager 100 can be located at any network element that occurs in the communication path between originating telephone 210 and CSP 230. For example, in the above example, call services manager 100 could also have been located at originating switch 220. Network elements can include, but are not limited to, originating central office telephone switches, access tandem telephone switches, IP private branch exchanges, softswitches, gateways, and routers. Originating and terminating telephones can include, but are not limited to, traditional telephones, IP telephones and computers providing voice communications.

Caller-ID/Directory Services Injection

IP-based voice networks differ significantly from traditional PSTN networks in the way they implement subscriber information services, such as Caller ID and Calling Name Delivery. In a PSTN network, the terminating carrier is responsible for resolving the caller's identification and presenting it to the terminating telephone user, subject to various privacy restrictions. It does this by accessing an authoritative database maintained by the originating carrier. See, e.g., *Bellcore Notes on the Networks*, Special Report 2275, Issue 3, December 1997 at 14.78-14.79. By contrast, in an IP network, the caller's identification information is passed along the call from the originating telephone to the terminating telephone. This presents at least two problems that compromise security and/or privacy in an IP network.

First, the inability of a terminating telephone to verify the caller identification information that it receives from the originating telephone presents an opportunity for the user of the terminating telephone to be deceived as to the true identity of the caller. This is particularly true since text-based IP protocols such as SIP allow for easy spoofing by the caller of his or her identification information. Using SIP, the caller at the originating telephone may send identification information to the terminating telephone that is not true (e.g., the caller can pose as some one that he is not).

Second, sending caller information with a call from the beginning of a call route to the end of the call route provides multiple opportunities for unauthorized parties to obtain such information. Each call in any given call route may pass through several carrier-based networks, which connect and control the call, before reaching the terminating telephone. Each of these switch points presents an opportunity for a third party to access the caller information. Because the caller information being passed with each call is generally unsecured, unauthorized parties can access information about the caller as the call proceeds to the terminating telephone.

To address these problems, one aspect of the present invention provides a method of validating and authenticating caller identification information in an IP voice network. A proxy, such as call services manager 100, can be associated with network elements within a terminating carrier network to determine the identification of the caller and provide accurate display of that information, such as the caller's name and/or telephone number.

According to the present invention, a call services manager, such as call services manager 100, monitors a call received by a terminating telephone and accesses an authentic database (e.g., maintained by the originating carrier) for information regarding the call and caller. Through this information, the call services manager can determine the true identity of the caller and communicate that identity to the user of the terminating telephone. Moreover, by accessing authentic caller identification information that is stored at a secure location, the present invention eliminates the need to pass caller identification information along with each call, thereby reducing bandwidth requirements and reducing the opportunities for improper access to private information. Use of this mechanism will also allow for the presentation of this caller identification information in networks where it is not currently available today—as in heterogeneous environments including H.323, SIP, SS7, ISDN, etc., where some combinations of these transit networks make end-to-end transmission of this information unreliable or not possible at all without the use of this mechanism.

Figure 6A:
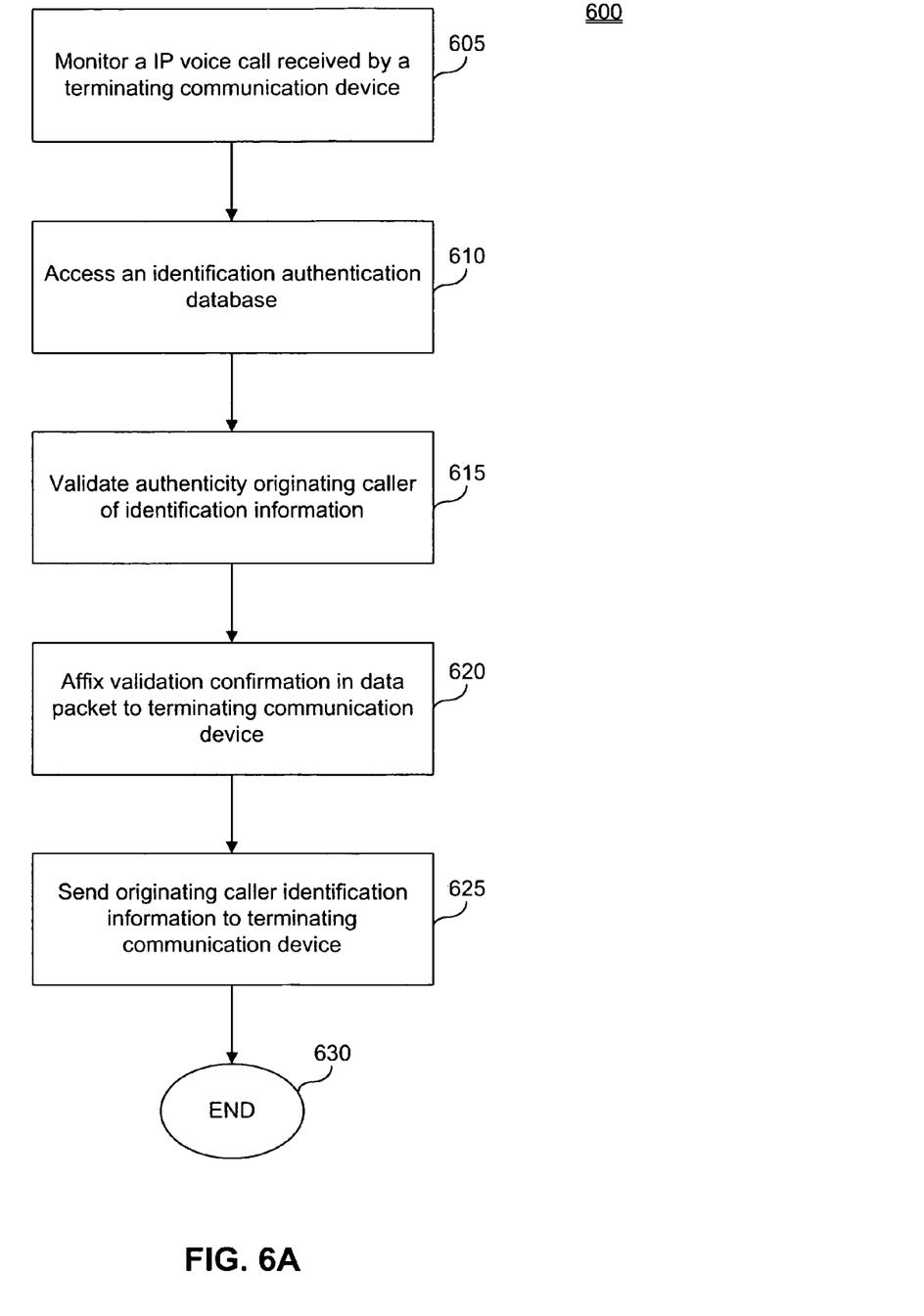
FIG. 6A is a flowchart of a method to validate caller identification information exchanged between an originating and terminating communication device, according to an embodiment of the invention.

FIG. 6A illustrates an embodiment of the invention related to validating caller identification information. In particular, FIG. 6A provides a flowchart of method 600 to validate caller identification information exchanged between an originating and terminating communications device, according to an embodiment of the invention. Method 600 will be explained with reference to FIG. 7, which illustrates a portion of a communication network 700. Portion of communication network 700 is not intended to limit the scope of the invention. Individuals skilled in the relevant arts will recognize other network configuration in which the invention can be used, based on the teachings herein.

Method 600 begins in step 605. In step 605 data packets associated in an IP voice call within a network supporting a terminating communication device are monitored. For example, referring to FIG. 7, call services manager 100 monitors signaling information received by terminating carrier network 740 for a call being established between originating telephone 710 and terminating telephone 770. Call services manager 100 is located within a network element within terminating carrier network 740 that supports terminating telephone 770. In this example, originating telephone 710 is supported by originating carrier network 720. Originating carrier network 720 and terminating carrier network 740 are coupled through one or more transit networks, such as transit network 730. Additionally, originating carrier network 720 and terminating carrier network 740 could be directly coupled, or only one network could serve as both the originating and terminating carrier networks. Originating carrier network 720 has a subscriber database 760 associated with it in which subscriber identity information is maintained.

Figure 7:
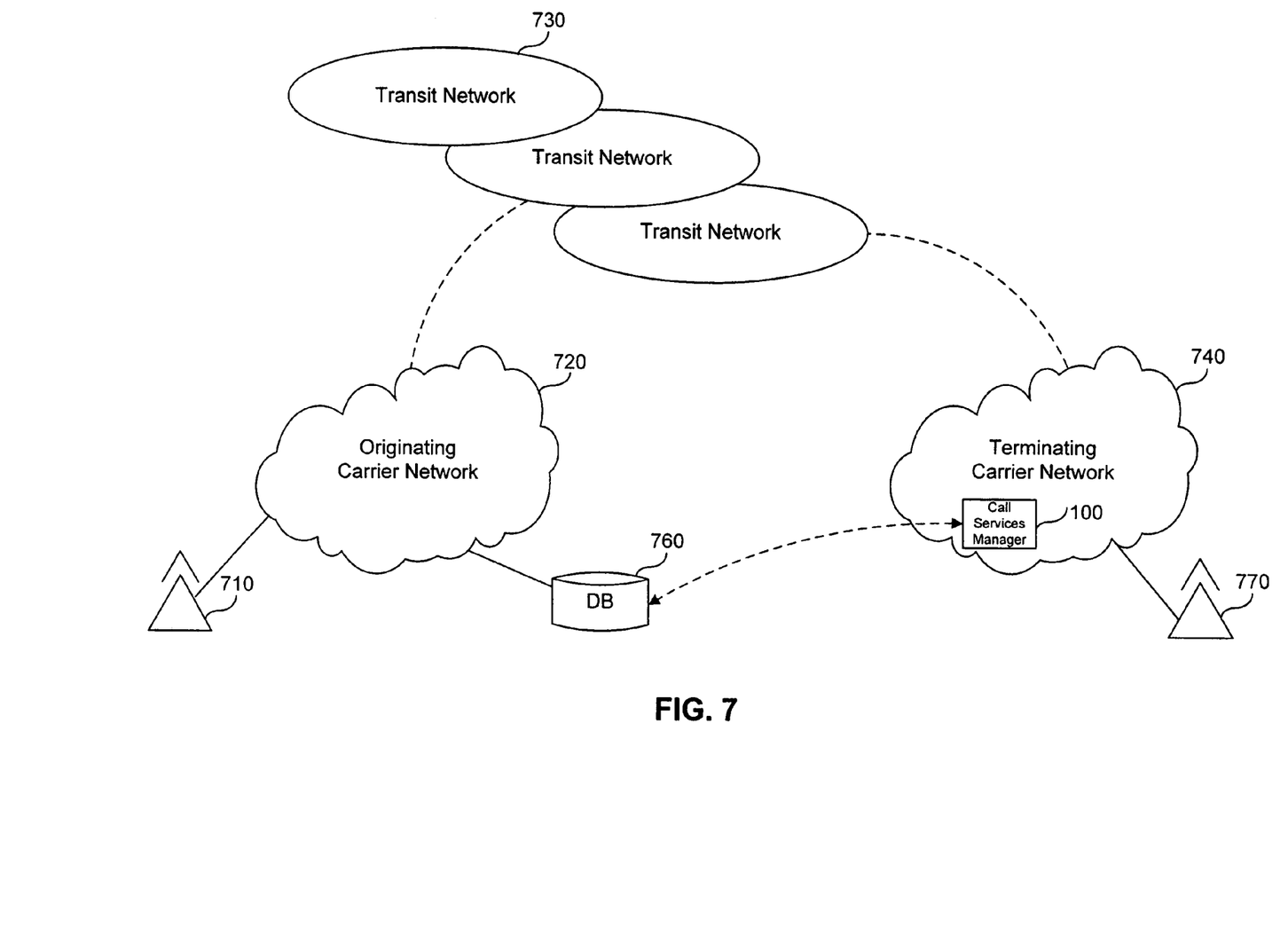
FIG. 7 is a diagram of a portion of a telephone network that demonstrates the use of a call services manager to provide caller identification validation and insertion, according to an embodiment of the invention.

Upon recognition of a call establishment attempt between originating telephone 710 and terminating telephone 770, in step 610 call services manager 100 sends a message to assess subscriber database 760, which includes an identification authentication database of information related to subscribers supported by the originating carrier.

Subscriber database 760 provides a return message that contains information to be used to validate the identity of the originating carrier. Upon receipt of this information, in step 615 call services manager 100 validates the authenticity of the originating caller identification information that it has received in the original signaling messages that it was monitoring. In step 620, call services manager 100 affixes a validation confirmation in a data packet to be sent to terminating telephone 770. In step 625 call services manager 100 sends the originating caller identification information to the terminating telephone 770.

In an alternative embodiment, the call is completed, but no validation confirmation information is sent to terminating telephone 770. In another embodiment, if the calling party identity is not validated, that is, the information received from subscriber database 760 and the information contained in the original signaling messages differ, then the call is rejected and call establishment is denied. In a further aspect of the invention, a prompt can be returned to the originating caller requesting proper identification.

Figure 6B:
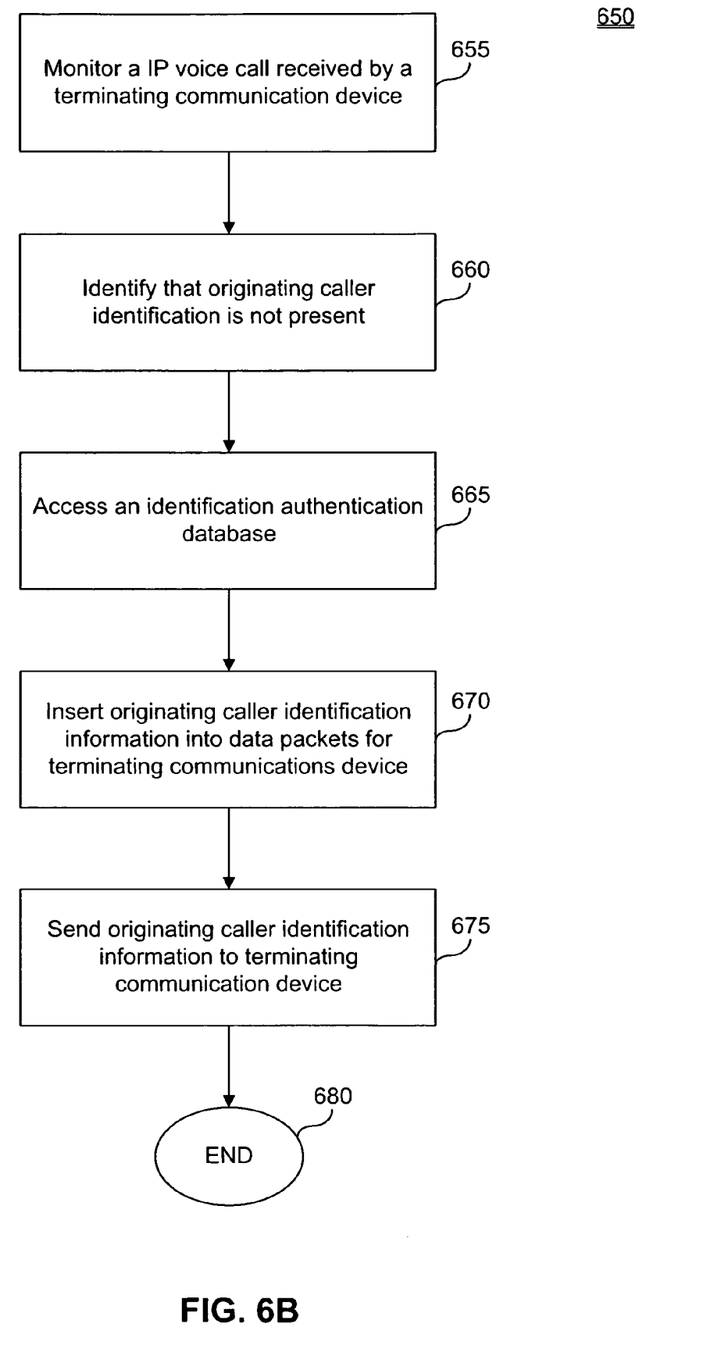
FIG. 6B is a flowchart of a method to obtain caller identification information for exchange between an originating and terminating communications device, according to an embodiment of the invention.

FIG. 6B provides a flowchart of method 650 to obtain caller identification information in an Internet Protocol (IP) voice network for exchange between an originating and terminating communications device. Method 650 will also be explained with reference to FIG. 7. Method 650 begins in step 655. In step 655 data packets associated in an IP voice call within a network supporting a terminating communication device are monitored. For example, referring to FIG. 7, call services manager 100 monitors signaling information received by terminating carrier network 740 for a call being established between originating telephone 710 and terminating telephone 770.

Upon recognition of a call establishment attempt between originating telephone 710 and terminating telephone 770, in step 660 the fact that originating caller identification information is not present is identified. For example, call services manager 100 recognizes that originating telephone 710 identification information is not present in call establishment messages.

In step 665, an identification authentication database is accessed. For example, call services manager 100 sends a message to assess subscriber database 760, which includes an identification authentication database of information related to subscribers supported by the originating carrier.

Subscriber database 760 provides a return message that contains subscriber identification information for originating caller 710. Upon receipt of this information, in step 670 the caller identification information is inserted into data packets destined for the terminating telephone. For example call services manager 100 inserts caller identification information for originating telephone 710 into data packets destined for terminating telephone 770.

In step 675 the originating caller identification information is sent to the terminating telephone. For example, call services manager 100 sends the originating caller identification information to the terminating telephone 770. Optionally, an identification validation confirmation can be sent to terminating telephone 770.

Network Router/Qos Optimization

Quality of service of IP-based voice communication is a significant concern. Unlike TDM-based PSTN networks, which can provide a guaranteed minimum level of voice quality on every call, IP networks are "bursty" environments with no real workable classification schemes to distinguish between file transfers and voice communications. As a result, voice and data packets share the same bandwidth and are treated in the same way by the IP network. This inability to differentiate between voice and data packets can lead to poor quality of service for voice communications. Unlike file transfer applications, which can tolerate reasonable delays in receipt of data packets (so long as they arrive in proper order), voice communication applications require timely receipt of voice packets, otherwise the service quality of application suffers significantly.

One solution that has been proposed to address QoS issues pertaining to voice communications in an IP network is to perform real time probing of current conditions on the network and call routes. Based on such probing, the carrier can select the best available route on which a call may be established. The bursty nature of IP networks, however, severely limits the usefulness of this best-available route solution. Because conditions on the network are in a constant state of flux, so are the routing decisions that are based on such monitored conditions. In other words, a "best available" route selected for a call based on conditions existing at one time may be a poor route only a few seconds later due to changes in the network. Thus, the desired level of service for an established call cannot be guaranteed and in fact, is likely to be extremely short lived, leading to a poor experience for the user.

One aspect of the present invention provides a solution to the QoS issues affecting voice communication in an IP network. Specifically, a proxy, such as, for example, call services manager 100, can dynamically transfer an established call on one route to another route in real time, whenever conditions warrant. A call services manager monitors at least two alternative call routes available for an established call. Specifically, call services manager 100 consistently monitors and analyzes the signaling component of the call. When the proxy determines that the current call route is no longer able to provide a certain level of service (e.g., based on a set of rule or criteria supplied to it by a carrier), the proxy sends instructions to a switch to transfer the voice component of the call to an alternative available route. During the length of a particular call session, the call can be transferred back and forth between available routes for as many times as is deemed necessary by the proxy to provide the optimum level of service possible in light of monitored conditions. Such dynamic transfers between available call routes are invisible to the users on the call.

In addition to passively monitoring calls to obtain the call condition information that it needs to determine whether to transfer a call, call services manager 100 can also actively query network components in the various call paths for call condition information necessary to make such transfer determinations. Such querying can be used with or without monitoring the signaling component of an existing call to make a determination to switch call routes.

Figure 8:
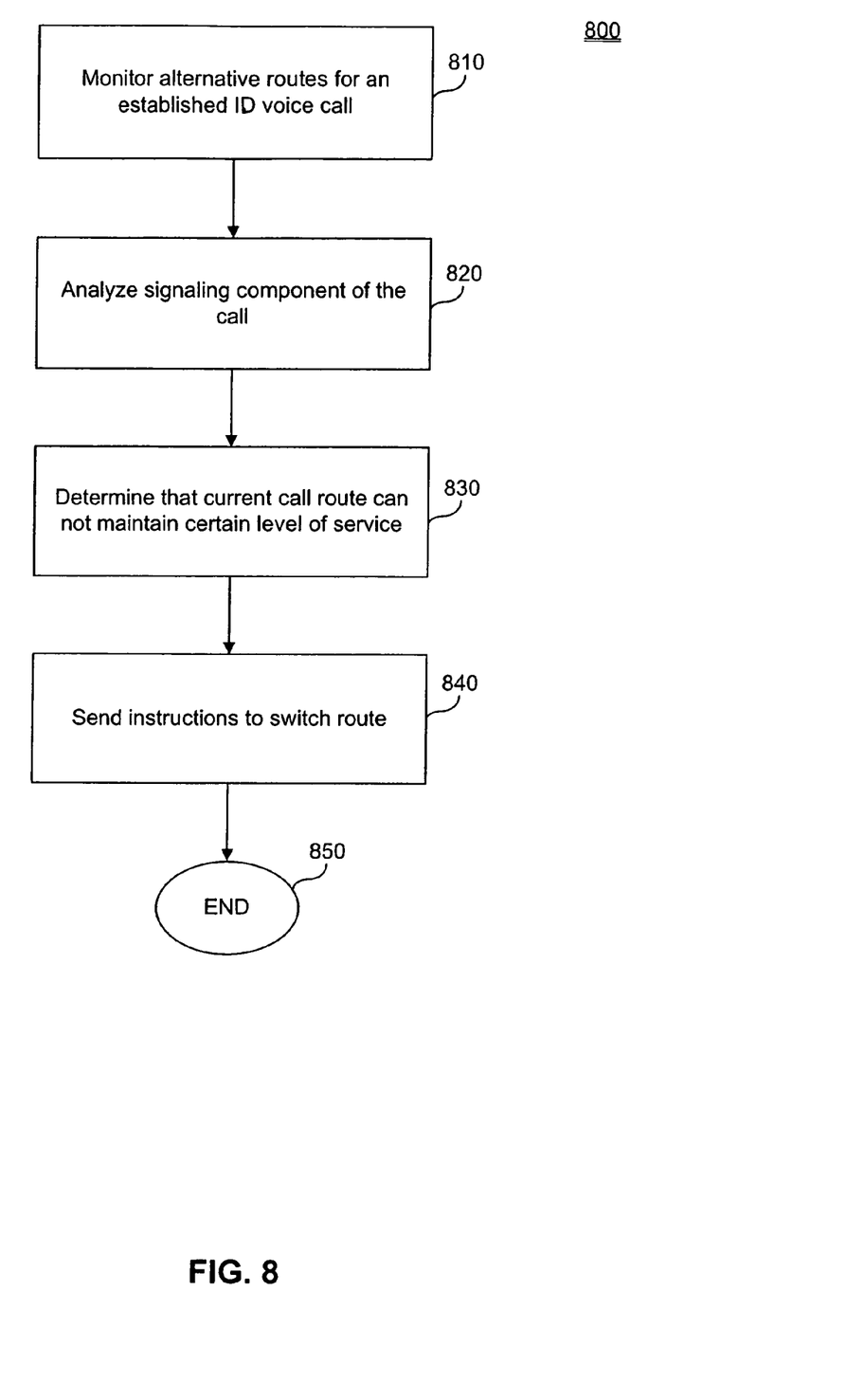
FIG. 8 is a flowchart of a method to dynamically route IP voice calls, according to an embodiment of the invention.

FIG. 8 provides a flowchart of method 800 that dynamically transfers an IP voice call from one call route to another call route based on performance comparisons of the routes, according to an embodiment of the invention. FIG. 8 is explained with reference to FIG. 9.

Figure 9:
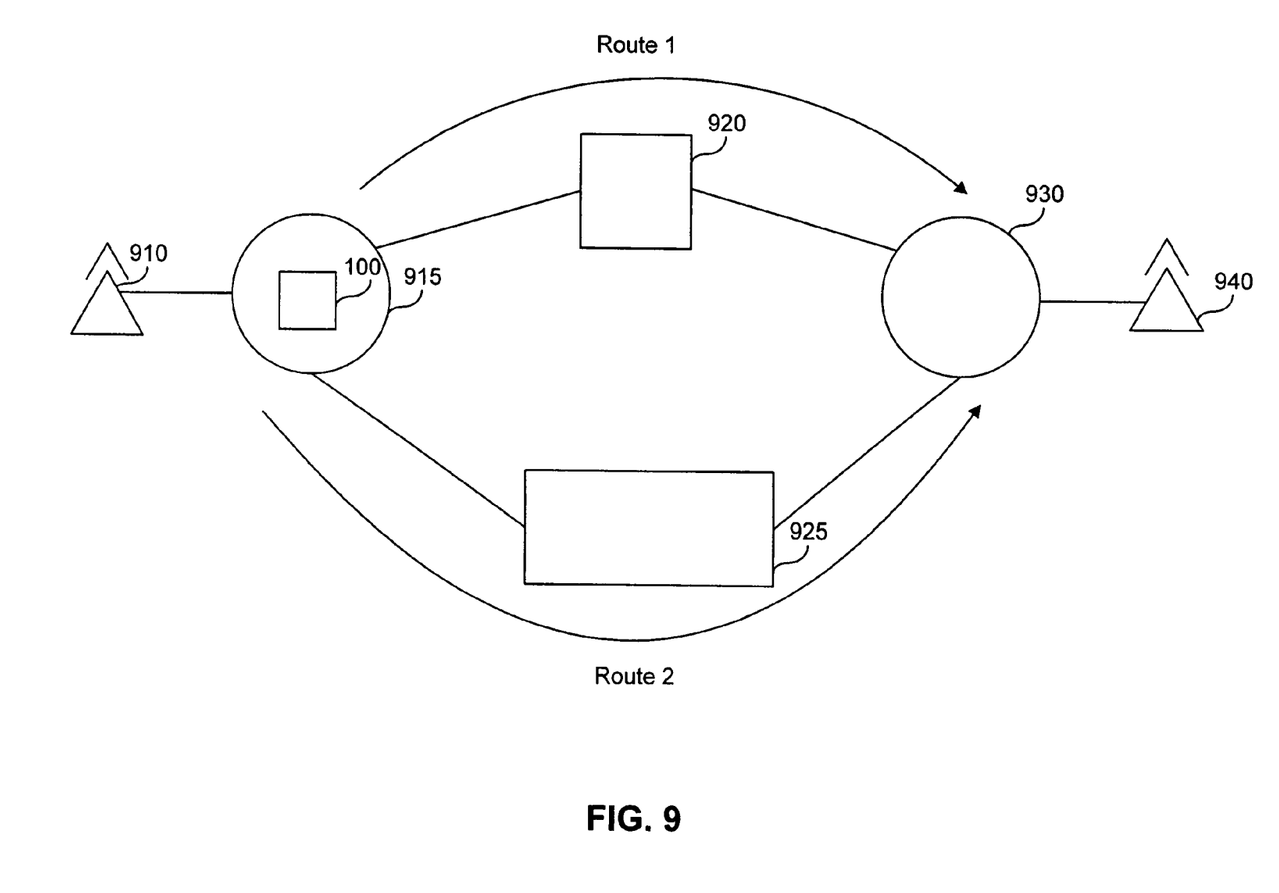
FIG. 9. is a diagram of a portion of a telephone network that demonstrates how IP voice calls are dynamically routed based on the method of FIG. 8, according to an embodiment of the invention.

FIG. 9 illustrates a portion of a telecommunications network in which originating telephone 910 has established a call with terminating telephone 940. FIG. 9 shows two potential call routes. Call route 1 includes originating switch 915, intermediary switch 920 and terminating switch 930. Call route 2 includes originating switch 915, intermediary switch 925 and terminating switch 930. Originating switch 915 supports originating telephone 910, and terminating switch 930 supports terminating telephone 940. Call services manager 100 is located within originating switch 915. As will be known by individuals skilled in the arts, there can be many more routes that could connect originating telephone 910 and terminating telephone 940. Additionally, in any given route, multiple intermediate network elements can exist.

Method 800 is invoked following the establishment of a call between two telephones, such as originating telephone 910 and terminating telephone 940. Method 800 begins in step 810. In step 810 alternate routes are monitored for performance for an established IP voice call. For example, referring to FIG. 9, if a call has been established over Route 1, call services manager 100 can monitor the performance of Route 1 and also Route 2. A wide range of performance parameters can be monitored, for example, bandwidth, congestion, traffic policing and/or shaping policy, call priority (e.g., 911 priority calls), bit error rates, delay and jitter.

In step 820 the signaling component of a call is analyzed. Thresholds for what performance levels are adequate performance can be set in call services manager 100, such that in one embodiment, call services manager 100 will only monitor performance on other routes if those performance thresholds are not being met on the current Route. Additionally, performance levels can be continuously analyzed and monitored for alternate routes, such that the route with the best performance level can always be selected.

In step 830 a determination is made whether the current call route can not maintain a certain level of service. For example, call services manager 100 can determine that Route 1 no longer supports a certain level of service.

In step 840 if a determination has been made that the desired level of service can not be met on a particular route, instructions can be sent to switch routes. For example, call services manager 100 can provide instructions to originating switch 915 to change from Route 1 to Route 2. In step 850, method 800 ends.

In a further aspect of the invention, call services manager 100 can query network elements to obtain performance information about alternative routes. For example, assuming Route 1 was being used for a call. Call services manager 100 could query intermediary switch 925 to request performance data about Route 2.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. In an Internet Protocol (IP) voice network a method to improve communication link utilization on a call requiring a use of a central service platform, wherein a call connection has been established between an originating communications device and the central service platform and a call connection has been established between a terminating communications device and the central service platform comprising:
  passively monitoring signaling data about the call between the originating communications device and the central service platform;
  allowing the central service platform to provide an enhanced call service;
  establishing a call connection between the originating communications device and the terminating communications device that excludes the central service platform;
  dropping call connections between the originating communications device and the central service platform and between the terminating communications device and the central service platform; and
  passively monitoring signaling data about the call connection between the originating communications device and the terminating communications device following dropping call connections between the originating communications device and the central service platform and between the terminating communications device and the central service platform.

2. The method of claim 1, wherein passively monitoring signaling data about the call between the originating communications device and the central service platform includes passively monitoring signaling data about the call between the originating communications devices and the central service platform by a call services manager located at a network element directly or indirectly connected to the originating communications device.

3. The method of claim 2, wherein the network element is an originating central office telephone switch, an originating access tandem telephone switch, an IP private branch exchange, a gateway switch or a router.

4. The method of claim 1, wherein the originating communications device is a telephone, an IP telephone or a personal computer used to provide voice communications.

5. A call services manager for processing data packets transmitted within an IP network or between IP networks containing voice data and signaling data associated with an established call between an originating user and a central service platform and an established call between the central service platform and a terminating user, comprising:
  an input protocol stack that decodes data packets and distinguishes between voice data and signaling data;
  an output protocol stack that encodes data packets and distinguishes between voice data and signaling data;
  a call control manager that monitors the voice content within data packets;
  an application logic manager that performs call processing functions based on the signaling data, whereas such call processing functions include the transfer of an established call between an originating user and a central service platform and an established call between the central service platform and a terminating user to a single call directly between the originating user and the terminating user, wherein call processing functions further include passively monitoring signaling data about the call connection between the originating user and the terminating user following dropping call connections between the originating user and the central service platform and between the terminating user and the central service platform;
  an interface manager that supports interfaces to external components for gathering call service and processing information; and
  a routing manager that controls the interface manager.

6. The call services manager of claim 5, wherein the application logic manager optimizes bandwidth utilization on communication links used to exchange data packets.

7. The call services manager of claim 5, wherein the application logic manager performs call routing on communication links used to exchange data packets.

* * * * *